US 8,578,387 B1

(12) United States Patent
Mills et al.

(10) Patent No.: US 8,578,387 B1
(45) Date of Patent: Nov. 5, 2013

(54) DYNAMIC LOAD BALANCING OF INSTRUCTIONS FOR EXECUTION BY HETEROGENEOUS PROCESSING ENGINES

(75) Inventors: Peter C. Mills, San Jose, CA (US); Stuart F. Oberman, Sunnyvale, CA (US); John Erik Lindholm, Saratoga, CA (US); Samuel Liu, Cupertino, CA (US)

(73) Assignee: Nvidia Corporation, Santa Clara, CA (US)

( * ) Notice: Subject to any disclaimer, the term of this patent is extended or adjusted under 35 U.S.C. 154(b) by 1388 days.

(21) Appl. No.: 11/831,873

(22) Filed: Jul. 31, 2007

(51) Int. Cl.
*G06F 9/46* (2006.01)

(52) U.S. Cl.
USPC ............... 718/105; 712/20; 712/22; 712/200; 712/208

(58) Field of Classification Search
None
See application file for complete search history.

(56) References Cited

U.S. PATENT DOCUMENTS

| 5,430,851 | A | | 7/1995 | Hirata et al. | |
|---|---|---|---|---|---|
| 5,471,597 | A | * | 11/1995 | Byers et al. | 711/215 |
| 5,537,542 | A | | 7/1996 | Eilert et al. | |
| 5,627,982 | A | | 5/1997 | Hirata et al. | |
| 5,669,011 | A | * | 9/1997 | Alpert et al. | 712/23 |
| 5,694,602 | A | * | 12/1997 | Smith | 718/105 |
| 6,076,174 | A | * | 6/2000 | Freund | 714/47.3 |
| 6,128,642 | A | * | 10/2000 | Doraswamy et al. | 709/201 |
| 6,219,780 | B1 | * | 4/2001 | Lipasti | 712/215 |
| 6,223,205 | B1 | * | 4/2001 | Harchol-Balter et al. | 718/105 |
| 6,237,083 | B1 | * | 5/2001 | Favor | 712/217 |
| 6,338,133 | B1 | * | 1/2002 | Schroter | 712/214 |
| 6,928,533 | B1 | * | 8/2005 | Eisen et al. | 712/218 |
| 7,366,878 | B1 | * | 4/2008 | Mills et al. | 712/214 |
| 7,401,204 | B1 | | 7/2008 | Miyake et al. | |
| 7,418,576 | B1 | * | 8/2008 | Lindholm et al. | 712/214 |
| 7,448,038 | B2 | * | 11/2008 | Beaumont | 718/105 |
| 7,624,255 | B1 | * | 11/2009 | Rouet et al. | 712/220 |
| 7,761,697 | B1 | * | 7/2010 | Coon et al. | 712/233 |
| 7,895,596 | B2 | * | 2/2011 | Kelly et al. | 718/102 |
| 8,024,735 | B2 | * | 9/2011 | Rudd et al. | 718/102 |
| 8,087,029 | B1 | * | 12/2011 | Lindholm et al. | 718/105 |
| 2003/0153994 | A1 | * | 8/2003 | Jin et al. | 700/99 |
| 2004/0054999 | A1 | * | 3/2004 | Willen et al. | 718/103 |
| 2004/0111589 | A1 | | 6/2004 | Lines et al. | |
| 2004/0172521 | A1 | * | 9/2004 | Hooker et al. | 712/225 |
| 2004/0186904 | A1 | * | 9/2004 | Oliveira | 709/225 |
| 2004/0193854 | A1 | * | 9/2004 | Cho | 712/235 |
| 2004/0205761 | A1 | * | 10/2004 | Partanen | 718/105 |

(Continued)

OTHER PUBLICATIONS

Office Action, U.S. Appl. No. 11/935,266, dated Feb. 1, 2010.

(Continued)

*Primary Examiner* — Emerson Puente
*Assistant Examiner* — Hiren Patel
(74) *Attorney, Agent, or Firm* — Patterson & Sheridan, L.L.P.

(57) ABSTRACT

An embodiment of a computing system is configured to process data using a multithreaded SIMD architecture that includes heterogeneous processing engines to execute a program. The program is constructed of various program instructions. A first type of the program instructions can only be executed by a first type of processing engine and a third type of program instructions can only be executed by a second type of processing engine. A second type of program instructions can be executed by the first and the second type of processing engines. An assignment unit may be configured to dynamically determine which of the two processing engines executes any program instructions of the second type in order to balance the workload between the heterogeneous processing engines.

15 Claims, 6 Drawing Sheets

(56) References Cited

U.S. PATENT DOCUMENTS

| | | | |
|---|---|---|---|
| 2004/0250045 A1* | 12/2004 | Dowling | 712/10 |
| 2004/0268335 A1* | 12/2004 | Martin et al. | 717/161 |
| 2005/0111363 A1* | 5/2005 | Snelgrove et al. | 370/230 |
| 2005/0132380 A1* | 6/2005 | Chow | 718/105 |
| 2005/0223195 A1* | 10/2005 | Kawaguchi | 712/214 |
| 2006/0218380 A1* | 9/2006 | Boggs et al. | 712/218 |
| 2006/0224862 A1 | 10/2006 | Ahmed et al. | |
| 2007/0067606 A1* | 3/2007 | Lin et al. | 712/10 |
| 2007/0083735 A1 | 4/2007 | Glew | |
| 2007/0113058 A1* | 5/2007 | Tran et al. | 712/241 |
| 2007/0130447 A1* | 6/2007 | Coon et al. | 712/215 |
| 2007/0294510 A1 | 12/2007 | Stuttard et al. | |
| 2008/0209164 A1* | 8/2008 | Wildman | 712/22 |

OTHER PUBLICATIONS

Eggers, et al. "Simultaneous Multithreading: A Platform for Next-Generation Processors," *IEEE Micro*, vol. 17, No. 5, pp. 12-19, Sep./Oct. 1997.

* cited by examiner

DYNAMIC LOAD BALANCING OF INSTRUCTIONS FOR EXECUTION BY HETEROGENEOUS PROCESSING ENGINES

BACKGROUND OF THE INVENTION

1. Field of the Invention

The present invention generally relates to processing data using heterogeneous processing engines and more specifically to a system and method for dynamically balancing instruction execution between different heterogeneous processing engines.

2. Description of the Related Art

Current computing systems configured to execute programs include either fixed function computation units configured to execute a particular program instruction or set of program instructions or homogeneous processing engines configured to execute any valid program instruction. More recently, computing systems include heterogeneous processing engines, where different types of processing engines may each execute a subset of the different program instructions. In order to maximize processing throughput, it is desirable to distributing program instructions to the different processing engines so that each of the different types of processing engines are fully utilized.

Accordingly, what is needed in the art is systems and methods for improving program instruction execution throughput for computing systems that include heterogeneous processing engines.

SUMMARY OF THE INVENTION

An embodiment of a computing system is configured to process data using a multithreaded SIMD architecture that includes heterogeneous processing engines to execute a program. The program is constructed of various program instructions. A first type of the program instructions can only be executed by a first type of processing engine and a third type of program instructions can only be executed by a second type of processing engine. A second type of program instructions can be executed by the first and the second type of processing engines. An assignment unit may be configured to dynamically determine which type of processing engine executes each program instruction of the second type, in order to balance the workload between the heterogeneous processing engines.

Various embodiments of a method of the invention for dynamically load balancing instruction execution in a SIMD (single-instruction multiple-data) architecture with heterogeneous processing engines include receiving a program instruction, determining whether a target processing engine is specified by the program instruction, determining whether the program instruction is of a first type, a second type, or a third type, and assigning the program instruction for execution by one of the heterogeneous processing engines in the SIMD architecture. A first processing engine of the heterogeneous processing engines is configured to execute program instructions of the first type and the second type and a second processing engine of the heterogeneous processing engines is configured to execute program instructions of the second type and the third type. The program instruction is assigned for execution by one of the heterogeneous processing engines in the SIMD architecture based on a specified target or a weighted instruction count that is maintained for each of the heterogeneous processing engines. The program instruction is assigned for execution by the first processing engine when the program instruction is of the first type, the second processing engine when the program instruction is of the third type, and either the first processing engine or the second processing engine when the program instruction is of the second type.

Various embodiments of the invention include a system for dynamically load balancing instruction execution in a SIMD (single-instruction multiple-data) architecture that includes heterogeneous processing engines. The system includes a first processing engine of the heterogeneous processing engines, a second processing engine of the heterogeneous processing engines, and an work distribution unit. The first processing engine of the heterogeneous processing engines is configured to execute program instructions of a first type and program instructions of a second type. The second processing engine of the heterogeneous processing engines is configured to execute program instructions of a third type and program instructions of the second type, wherein the third type is different than the first type. The work distribution unit is coupled to the first processing engine and the second processing engine and configured to dynamically assign the program instructions of the first type for execution by the first processing engine, the program instructions of the third type for execution by the second processing engine, and the program instructions of the second type for execution by either the first processing engine or the second processing engine based on a specified target or a weighted instruction count for each of the heterogeneous processing engines in the SIMD architecture.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
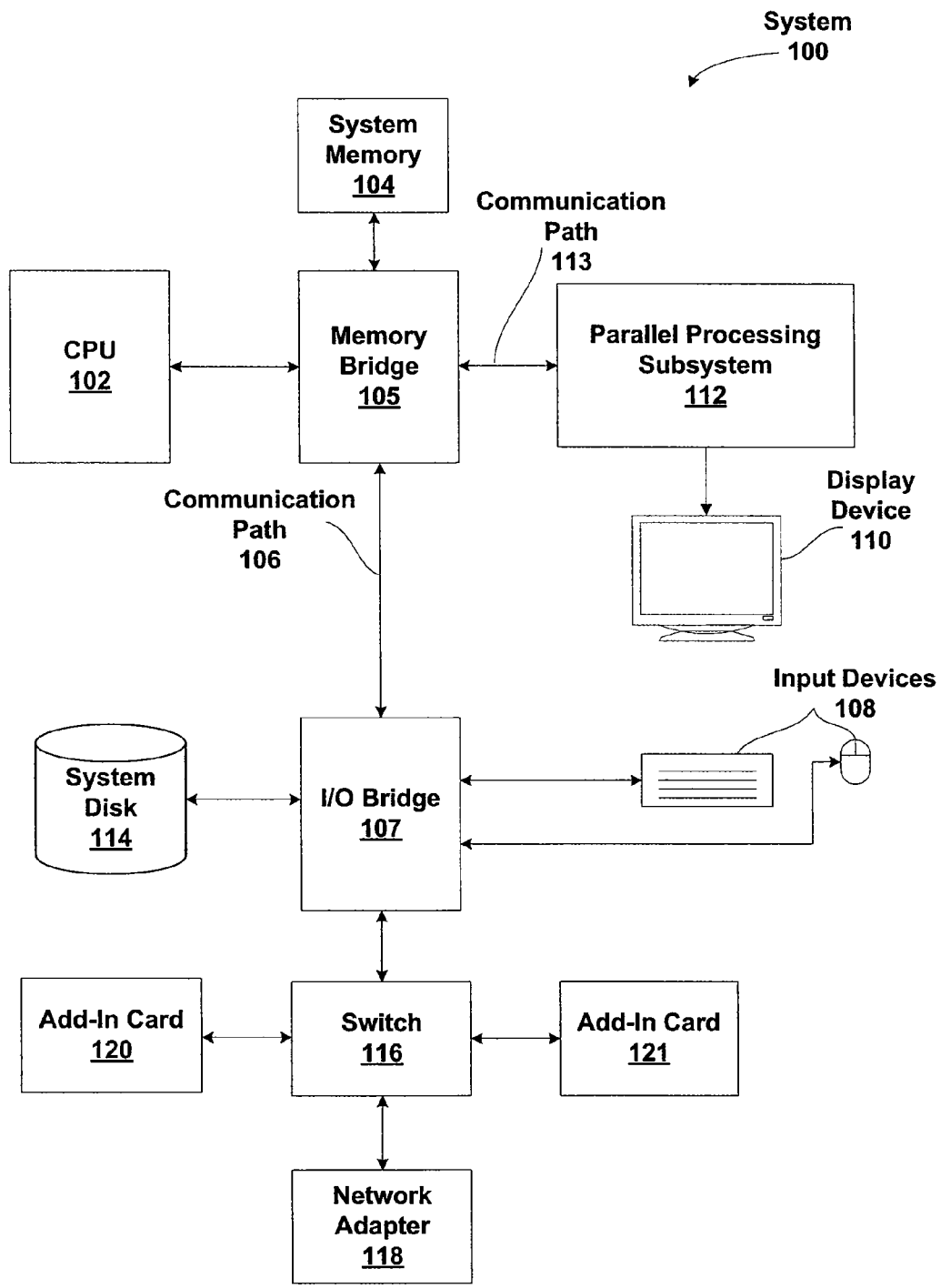
FIG. 1 is a block diagram illustrating a computer system configured to implement one or more aspects of the present invention.

FIG. 1 is a block diagram illustrating a computer system configured to implement one or more aspects of the present invention. FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

Figure 2:
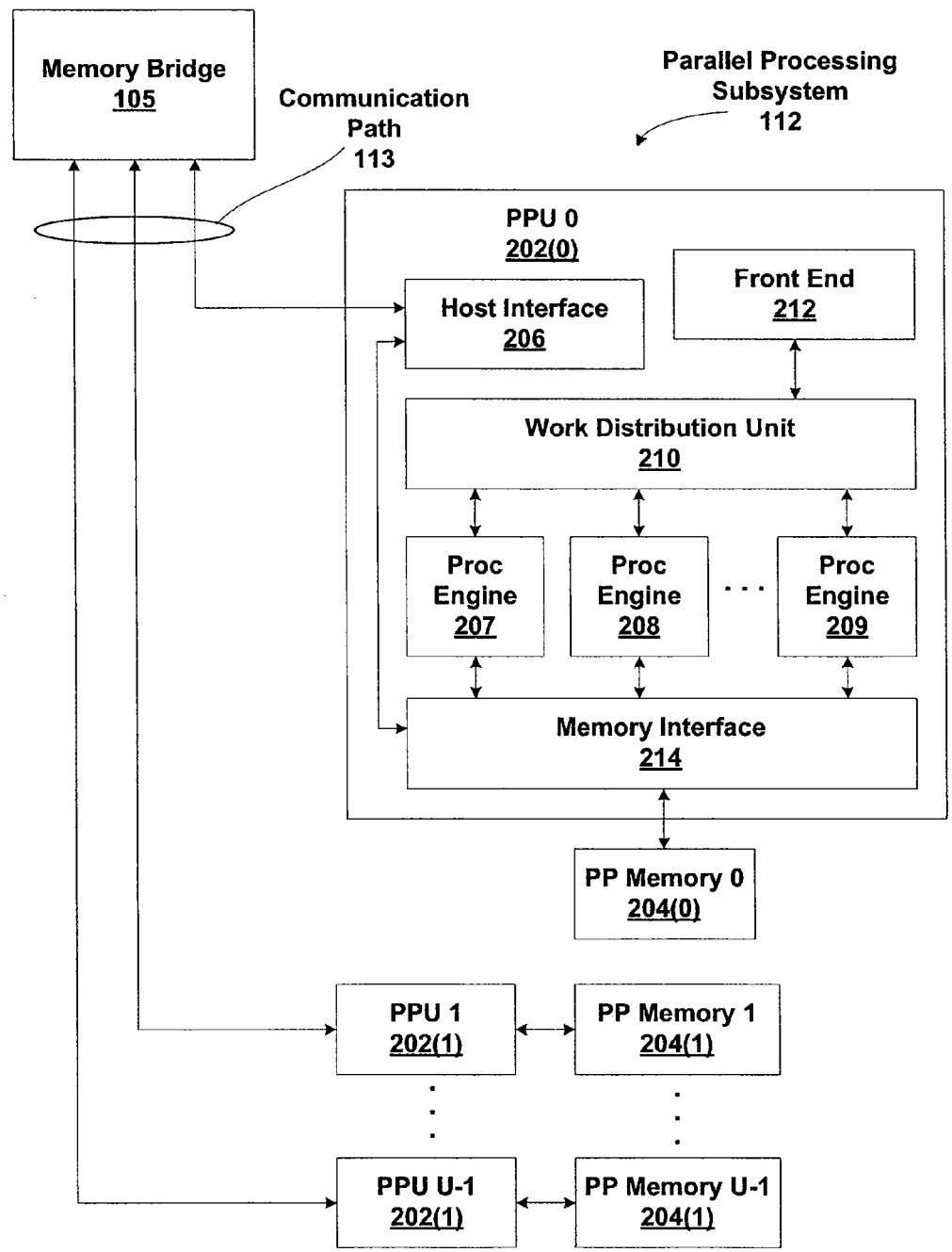
FIG. 2 is a block diagram of a parallel processing subsystem for the computer system of FIG. 1 in accordance with one or more aspects of the present invention.

An embodiment of parallel processing subsystem 112 is shown in FIG. 2. Parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and PP memories 204 may be implemented, e.g., using one or more integrated circuit devices such as programmable processors, application specific integrated circuits (ASICs), and memory devices.

As shown in detail for PPU 202(0), each PPU 202 includes a host interface 206 that communicates with the rest of system 100 via communication path 113, which connects to memory bridge 105 (or, in one alternative embodiment, directly to CPU 102). In one embodiment, communication path 113 is a PCI-E link, in which dedicated lanes are allocated to each PPU 202 as is known in the art. Other communication paths may also be used. Host interface 206 generates packets (or other signals) for transmission on communication path 113 and also receives all incoming packets (or other signals) from communication path 113 and directs them to appropriate components of PPU 202. For example, commands related to processing tasks may be directed to a front end unit 212 while commands related to memory operations (e.g., reading from or writing to PP memory 204) may be directed to a memory interface 214. Host interface 206, front end unit 212, and memory interface 214 may be of generally conventional design, and a detailed description is omitted as not being critical to the present invention.

Each PPU 202 advantageously implements a highly parallel processor. PPU 202 includes one or more heterogeneous processing engines 207, 208, and 209 that are configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units for each thread.

As shown in detail for PPU 202(0), a PPU 202 includes a number C of heterogeneous processing engines, where C≥1. The heterogeneous processing engines 207, 208, and 209 may be configured to perform different operations and therefore may execute different instructions. For example, processing engine 207 may be configured to perform floating point arithmetic operations (e.g., addition and multiplication), processing engine 208 may be configured to perform fixed point arithmetic operations, and processing engine 209 may be configured to perform texture mapping operations.

Figure 3:
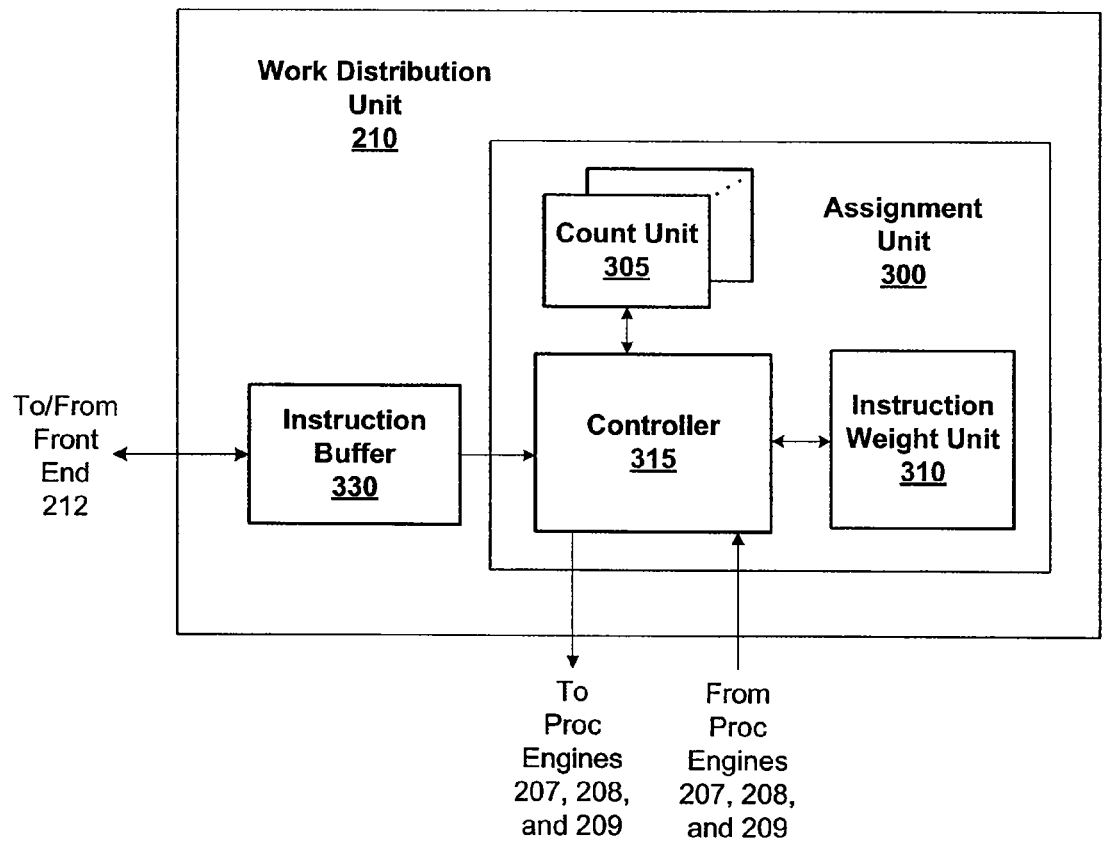
FIG. 3 is a block diagram of a work distribution unit for the parallel processing subsystem of FIG. 2 in accordance with one or more aspects of the present invention.
Figure 4:
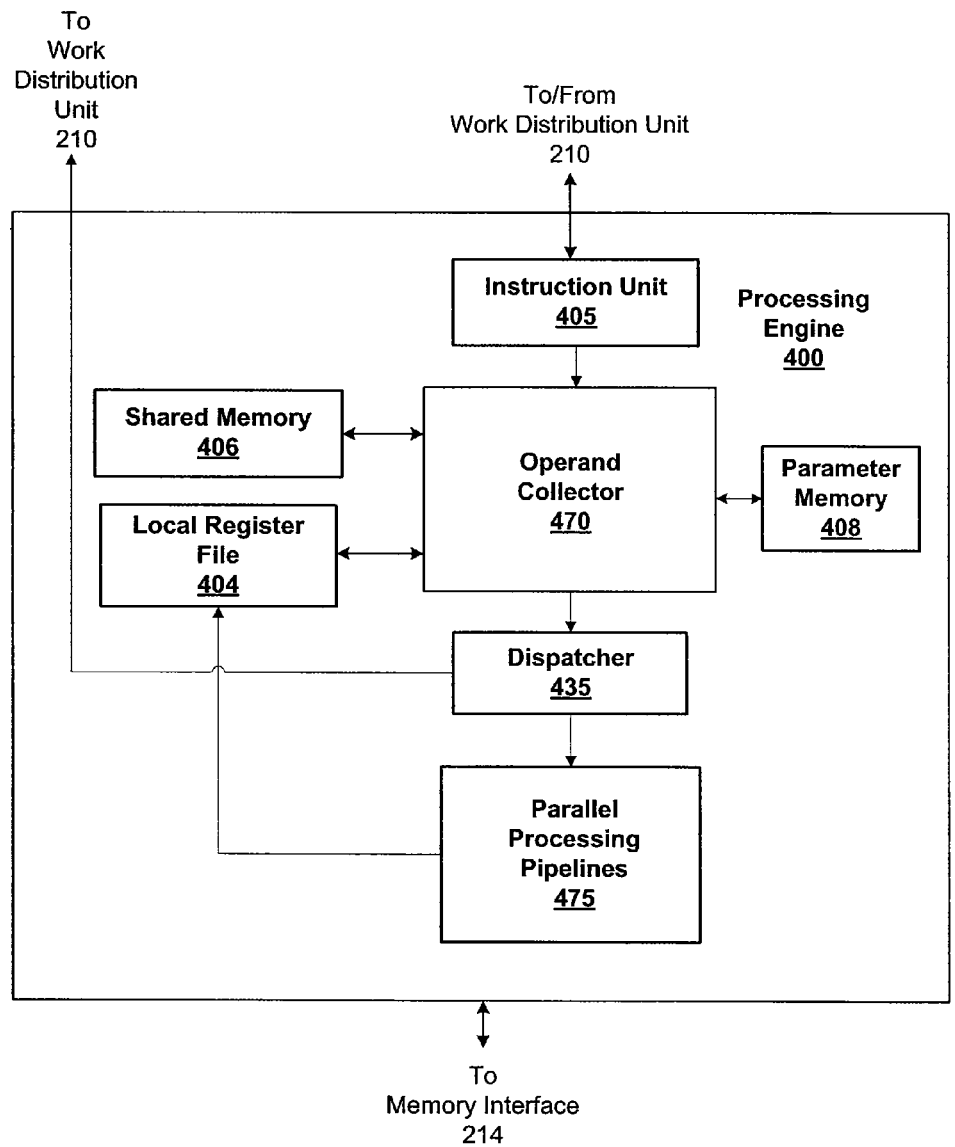
FIG. 4 is a block diagram of a processing engine for the parallel processing unit of FIG. 3 in accordance with one or more aspects of the present invention.

Each heterogeneous processing engine 207, 208, and 209 is capable of executing a large number (e.g., tens or hundreds) of threads concurrently, where each thread is an instance of a program; one embodiment of a multithreaded processing engine is described in conjunction with FIG. 4. Processing engines 207, 208, and 209 receive processing tasks to be executed via a work distribution unit 210, which receives commands defining processing tasks from a front end unit 212. Work distribution unit 210 can implement a variety of algorithms for distributing work. For instance, in one embodiment, work distribution unit 210 receives a "ready" signal from each processing engine indicating whether that processing engine has sufficient resources to accept a new processing task. When a new processing task arrives, work distribution unit 210 assigns the task to a processing engine and queues the processing task for output; if no processing engine is asserting the ready signal, work distribution unit 210 holds the any queued tasks until a ready signal is asserted by a processing engine. Work distribution unit 210 is configured to dynamically distribute instructions for execution by heterogeneous processing engines 207, 208, and 209, as described in further detail in conjunction with FIG. 3.

As previously explained, the different heterogeneous processing engines are configured to perform various operations, some of the operations may be performed by more than one of the processing engines and others that may only be performed by only one of the processing engines. For example, in some embodiments of the present invention, a first type of program instructions can only be executed by processing engine 207. The first type of program instructions may include floating point arithmetic operations (excluding the multiply operation since it is included in the second type). A second type of program instructions can be executed by processing engines 207 and 208 and are referred to as "dual issue" instructions. The second type of program instructions may include move and a floating point multiply operations. A third type of program instructions can only be executed by processing engines 208. The third type of program instructions may include fixed integer arithmetic operations such as addition, subtraction, and reciprocal. In some embodiments of the present invention, processing engine 209 may be configured to process program instructions of a fourth type, such as texture mapping program instructions, e.g., level of detail, texture address, and other computations for point sample, bilinear, trilinear, anisotropic texture mapping, and the like. Multiple instances of each type of processing engine, e.g., processing engine 207, 209, or 209, may be included in PPU 202.

An advantage of configuring more than one of the heterogeneous processing engines to process some instructions, e.g., dual issue instructions, is that those program instructions, i.e., the second type, can be assigned for execution by the type of heterogeneous processing engine with a lower workload to dynamically balance the workload. Balancing the workload permits better utilization of each processing engine to improve overall instruction execution throughput. When commonly used instructions are dual issue instructions, dynamic load balancing may be used to balance the processing workload more evenly than when only a small portion of the instructions in a program are dual issue.

In some embodiments of the present invention, a compiler specifies a target, the type of heterogeneous processing engine, e.g., processing engine 207, processing engine 208, or processing engine 209, that one or more program instructions are assigned to for execution. Work distribution unit 210 may be configured to use the specified target when assigning the program instruction for execution, or work distribution unit 210 may dynamically determine the type of heterogeneous processing engine that the program instruction is assigned to for execution. An advantage of postponing the assignment until the program is executing is that the load balancing may account for varying execution conditions as they occur, such as memory access latencies, branch execution, and the like.

Processing engines 207, 208, and 209 communicate with memory interface 214 to read from or write to various external memory devices. In one embodiment, memory interface 214 includes an interface adapted to communicate with local PP memory 204, as well as a connection to host interface 206, thereby enabling the processing engines to communicate with system memory 104 or other memory that is not local to PPU 202. Memory interface 214 can be of generally conventional design, and a detailed description is omitted.

Processing engines 207, 208, and 209 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPUs 202 may transfer data from system memory 104 and/or local PP memories 204 into internal (on-chip) memory, process the data, and write result data back to system memory 104 and/or local PP memories 204, where such data can be accessed by other system components, including, e.g., CPU 102 or another parallel processing subsystem 112.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local PP memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated PP memory device(s) or no dedicated PP memory device(s).

In operation, CPU 102 is the master processor of system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in FIG. 1), which may be located in system memory 104, PP memory 204, or another storage location accessible to both CPU 102 and PPU 202. PPU 202 reads the command stream from the pushbuffer and executes commands asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 202 to the rest of system 100 may also be varied. In some embodiments, PP system 112 is implemented as an add-in card that can be inserted into an expansion slot of system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU may be provided with any amount of local PP memory, including no local memory, and may use local memory and system memory in any combination. For instance, a PPU 202 can be a graphics processor in a unified memory architecture (UMA) embodiment; in such embodiments, little or no dedicated graphics (PP) memory is provided, and PPU 202 would use system memory exclusively or almost exclusively. In UMA embodiments, a PPU may be integrated into a bridge chip or processor chip or provided as a discrete chip with a high-speed link (e.g., PCI-E) connecting the PPU to system memory, e.g., via a bridge chip.

As noted above, any number of PPUs can be included in a parallel processing subsystem. For instance, multiple PPUs can be provided on a single add-in card, or multiple add-in cards can be connected to communication path 113, or one or more of the PPUs could be integrated into a bridge chip. The PPUs in a multi-PPU system may be identical to or different from each other; for instance, different PPUs might have different numbers of cores, different amounts of local PP memory, and so on. Where multiple PPUs are present, they may be operated in parallel to process data at higher throughput than is possible with a single PPU.

Systems incorporating one or more PPUs may be implemented in a variety of configurations and form factors, including desktop, laptop, or handheld personal computers, servers, workstations, game consoles, embedded systems, and so on.

Dynamic Load Balancing

FIG. 3 is a block diagram of a work distribution unit 210 for the parallel processing subsystem 112 of FIG. 2, in accordance with one or more aspects of the present invention. Work distribution unit 210 includes an assignment unit 300 and an instruction buffer 330. Instruction buffer 330 stores instructions received from front end 212 and assignment unit 300 outputs assigned instructions to processing engines 207, 208, and 209 for execution.

Assignment unit 300 includes a controller 315, count units 305, and an instruction weight unit 310. Assignment unit 300 assigns program instructions received from instruction buffer 330 for execution by one of processing engines 207, 208, and 209 as described in conjunction with FIGS. 5A and 5B, and outputs the assigned program instructions to a processing engine 207, 208, or 209. In some embodiments of the present invention, the assigned program instructions are queued for output to processing engines 207, 208, and 209 using a buffer, register file, first-in first-out memory, or the like.

When a target processing engine is specified by the program instruction, assignment unit 300 can be configured to assign the program instruction for execution by the target processing engine or assign the program instruction for execution based on the current load balancing information. The current load balancing information is provided by a weighted instruction count for each of the heterogeneous processing engines 207, 208, and 209. In other words, a count is maintained for each type of processing engine, so the number of count units 305 corresponds to the number of different types of processing engines. When processing engines 207, 208, and 209 are the only processing engine types in a PPU 202, the number of count units 305 is three.

When configured to override target processing engines specified by the program instructions, controller 315 receives instructions from instruction buffer 330 and assigns each instruction for execution by one type of processing engine (207, 208, or 209) based on the instruction and the weighted instruction counts provided by count units 305. Instruction weight unit 310 computes a weighted value for each assigned program instruction. The weighted value is proportional to the execution latency that is incurred when the program instruction is executed by the assigned processing unit. When the assigned instruction is dispatched for execution by the assigned processing engine, the weighted instruction count for the assigned processing engine type is updated using the computed weighted value, as described in conjunction with FIGS. 5A and 5B.

FIG. 4 is a block diagram of a processing engine 400, in accordance with one or more aspects of the present invention. Processing engine 400 may represent one or more of processing engines 207, 208, and 209. In some embodiments, work distribution unit 210 receives data to be processed (e.g., primitive data, vertex data, and/or pixel data) as well as state parameters and commands defining how the data is to be processed (e.g., what program is to be executed) from front end 212. Work distribution unit 210 can load data to be processed into shared memory 406 and parameters into parameter memory 408. Processing engine 400 initializes each new thread or SIMD thread group and begins executing the thread. When execution of a thread or SIMD thread group is completed, processing engine 400 advantageously notifies work distribution unit 210. Work distribution unit 210 can then initiate other processes, e.g., to retrieve output data from shared memory 306 and/or to prepare processing engine 400 for execution of additional threads or SIMD thread groups.

When processing engine 400 receives an assigned program instruction from dispatcher 435 instruction unit 405 decodes the instruction. Some program instructions are control instructions, such as jump, branch, call, return, and the like. Control instructions are executed by instruction unit 405 since they do not require processing by arithmetic sub-units within parallel processing pipelines 475. Instruction unit 405 extracts any target program counter (address) specified by a control instruction and the program instructions starting at the target address are read and executed. Instruction unit 405 outputs other program instructions to operand collector 470 and a read request is generated to obtain any operands that are needed to execute the program instruction. The read request is output to local register file 404 or shared memory 406, and when the program instruction operands are obtained, the program instruction and operands are output to parallel processing pipelines 475 for processing.

In one embodiment, each parallel processing pipelines 475 includes an array of P (e.g., 8, 16, etc.) pipelines that are configured to receive SIMD instructions and operands. The functional units in each pipeline are pipelined, allowing a new instruction to be issued before a previous instruction has finished, as is known in the art. In one embodiment, the functional units support a variety of operations including comparison operations, Boolean operations (AND, OR, XOR), bit-shifting, and computation of various algebraic functions (e.g., planar interpolation, trigonometric, exponential, and logarithmic functions, etc.).

Each processing engine 400 uses space in local register file 304 for storing its local input data, intermediate results, and the like. In one embodiment, local register file 304 is physically or logically divided into P lanes, each having some number of entries (where each entry might store, e.g., a 32-bit word). One lane is assigned to each pipeline within parallel processing pipelines 475, and corresponding entries in different lanes can be populated with data for different threads executing the same program to facilitate SIMD execution. In some embodiments, each pipeline can only access local register file 404 entries in the lane assigned to it. The total number of entries in local register file 304 is advantageously large enough to support multiple concurrent threads per processing engine 400.

Each pipeline within parallel processing pipelines 475 also has access to an on-chip shared memory 306 that is shared among all of the pipelines. Shared memory 306 may be as large as desired, and in some embodiments, any pipeline can read to or write from any location in shared memory 306 with equally low latency (e.g., comparable to accessing local register file 304). In some embodiments, shared memory 306 is implemented as a shared register file; in other embodiments, shared memory 306 can be implemented using shared cache memory.

In addition to shared memory 306, some embodiments also provide additional on-chip parameter memory and/or cache(s) 308, which may be implemented, e.g., as a conventional RAM or cache. Parameter memory/cache 308 can be used, e.g., to hold state parameters and/or other data (e.g., various constants) that may be needed by multiple threads. Parallel processing pipelines 475 also have access via memory interface 214 to off-chip "global" memory which can include, e.g., PP memory 204 and/or system memory 104, with system memory 104 being accessible by memory interface 214 via host interface 206 as described above. It is to be understood that any memory external to PPU 202 may be used as global memory. Parallel processing pipelines 475 can be coupled to memory interface 214 via an interconnect (not explicitly shown) that allows any pipeline to access global memory.

In one embodiment, each pipeline is multithreaded and can execute up to some number G (e.g., 24) of threads concurrently, e.g., by maintaining current state information associated with each thread in a different portion of its assigned lane in local register file 304. Parallel processing pipelines 475 are advantageously designed to switch rapidly from one thread to another so that instructions from different threads can be issued in any sequence without loss of efficiency.

Instruction unit 405 is configured such that, for any given processing cycle, the same instruction (INSTR) is issued to all P pipelines within parallel processing pipelines 475. Thus, at the level of a single clock cycle, processing engine 400 implements a P-way SIMD microarchitecture. Instruction unit 405 is configured to output program instructions for each pipeline at a rate that those pipelines can consume the program instructions. Therefore, in some embodiments of the present invention, instruction unit 405 is configured to output one instruction each clock cycle. Since each pipeline is also pipelined, supporting up to G threads concurrently, processing engine 400 in this embodiment can have up to P*G threads executing concurrently. For instance, if P=16 and G=24, then processing engine 400 supports up to 384 concurrent threads.

Because instruction unit 405 issues the same instruction to all P pipelines within parallel processing pipelines 475 in parallel, processing engine 400 is advantageously used to process threads in "SIMD thread groups." As used herein, a "SIMD thread group" refers to a group of up to P threads of execution of the same program on different input data, with one thread of the group being assigned to each pipeline. A SIMD thread group may include fewer than P threads, in which case some of the pipelines will be idle during cycles when that SIMD thread group is being processed. A SIMD thread group may also include more than P threads, in which case processing will take place over consecutive clock cycles. Since each pipeline can support up to G threads concurrently, it follows that up to G SIMD thread groups can be executing in processing engine 400 at any given time.

It will be appreciated that the core architecture described herein is illustrative and that variations and modifications are possible. Any number of processing engines may be included. In some embodiments, each pipeline has its own local register file, and the allocation of local register file entries per thread can be fixed or configurable as desired. Further, while only processing engines 207, 208, and 209 are shown in FIG. 2, a PPU 202 may include any number of processing engines 207, 208, and 209. Each processing engine 207, 208, and 209 advantageously operates independently of other processing engines and has its own register files, shared memory, and so on.

By dynamically assigning instructions for execution by the different processing engines, work distribution unit 210 is able to load balance between the different processing engines and improve overall program instruction execution throughput. An advantage of restricting the operations performed by a particular processing engine is that the performance of the processing engine may be optimized for that operation. Therefore, heterogeneous processing engines may provide in a greater throughput and/or reduced circuitry, which may reduce the overall die area and power consumption compared with homogeneous processing engines.

Figure 5A:
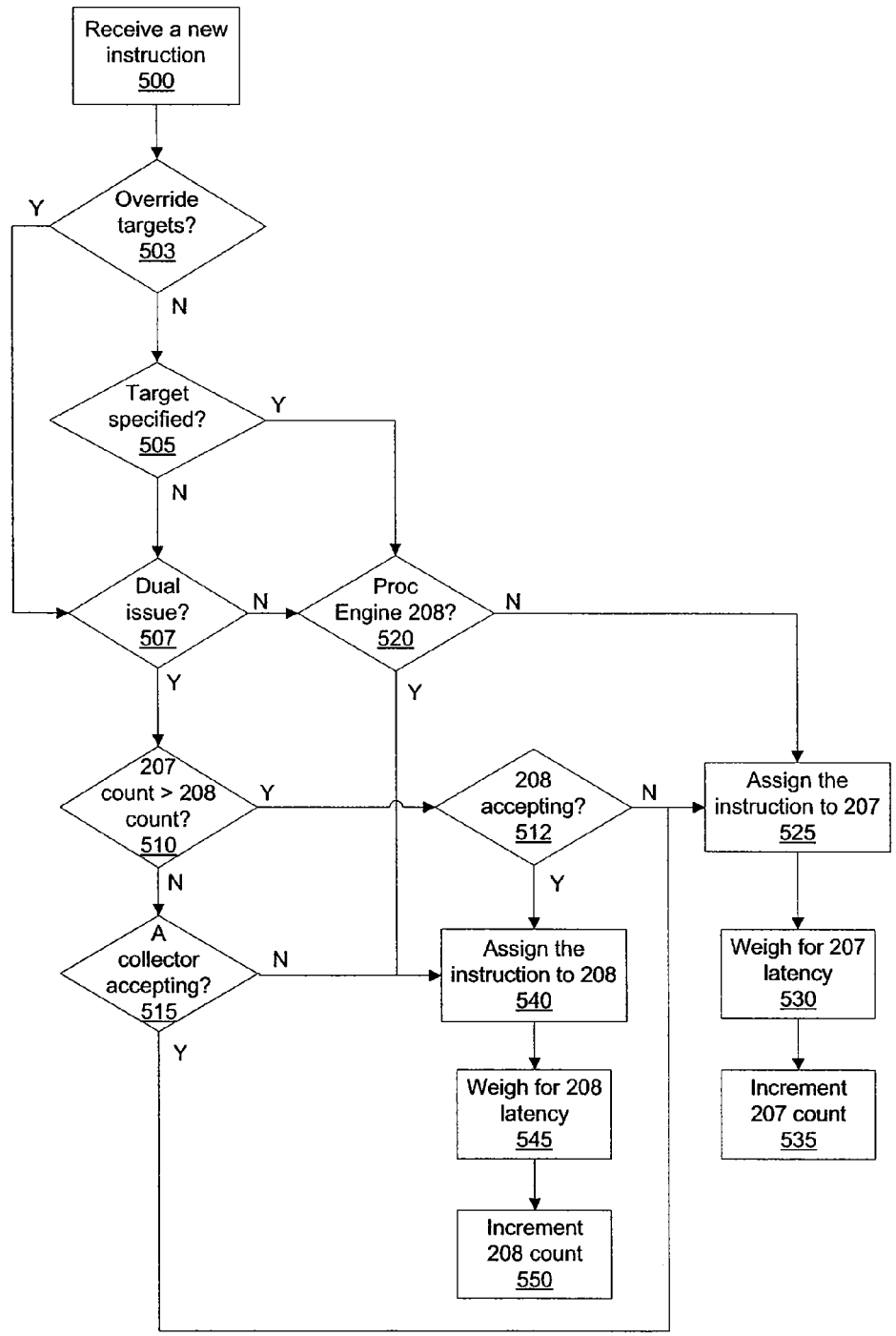
FIG. 5A is a flow diagram of method steps for performing load balancing of the instructions in accordance with one or more aspects of the present invention.

FIG. 5A is a flow diagram of method steps for performing dynamic load balancing during assignment of the program instructions for execution by the heterogeneous processing engines 207, 208, or 209, in accordance with one or more aspects of the present invention. FIG. 5A illustrates dynamic load balancing when two types of heterogeneous processing engines are used, such as processing engine 207 and processing engine 208. In other embodiments of the present invention, additional heterogeneous processing engines may be used, and those skilled in the art may extend the described method to include those additional heterogeneous processing engines in the assignment process. In step 500 assignment unit 300 receives a new program instruction from instruction buffer 330. As previously described, some program instructions are not executed by processing engines 207, 208, or 209, and those instructions are processed separately.

In step 503, assignment unit 300 determines if specified targets should be overridden, and, if so, assignment unit 300 proceeds directly to step 507. Otherwise, in step 505, assignment unit 300 determines if a target is specified for the program instruction, and, if so, assignment unit 300 proceeds directly to step 520. The following sequence includes move (MOV) instructions that are specified for execution by a particular target or are specified for dynamic assignment by assignment unit 300.

MOV.A
MOV.B
MOV.DYNAMIC

If, in step 505 assignment unit 300 determines that a target is not specified for the program instruction, then in step 507 assignment unit 300 determines if the program instruction is a dual issue program instruction, i.e., that can be executed by more than one type of the heterogeneous processing engines.

If, in step 507 assignment unit 300 determines that the program instruction is a dual issue program instruction, then in step 510 assignment unit 300 determines if a weighted instruction count of instructions that are assigned for execution by processing engine 207, is greater than a weighted instruction count of instructions that are assigned for execution by processing engine 208. Initial weighted instructions counts for processing engines 207, 208m, and 209 are determined by adding together all of the computed weighted values of targeted instructions that are in instruction buffer 330 for each of the heterogeneous processing engines. Dual issue instructions are counted with a weighted value of zero. If, in step 510 instruction weight unit 310 determines that the weighted instruction count for processing engine 207 is not greater than the weighted instruction count for processing engine 208, then in step 515 assignment unit 300 determines if a processing engine 207 is accepting assigned instructions.

If, in step 515 assignment unit 300 determines that a processing engine 207 is accepting assigned instructions, then in step 525 assignment unit 300 assigns the instruction for execution by the processing engine 207. In step 530 instruction weight unit 310 computes a weighted value that is based on the latency needed to execute the assigned instruction by processing engine 207. In step 535 the count unit 305 corresponding to processing engine 207 increments the weighted instruction count for processing engine 207 by the computed weighted value to update the weighted instruction count. The weighted value that is computed for an instruction may vary depending on the processing engine to which the instruction is assigned for execution. For example, processing engine 207 may be configured to execute a floating point multiply instruction in a single clock cycle, while processing engine 208 may be configured to execute the floating point multiple instruction in one to four clock cycles. Therefore, the floating point multiply instruction weighted value is one for processing engine 207 and two (to cover the range of one to four) for processing engine 208. Other dual issue instructions, such as MOV have a weighted value of one for processing engine 207 and processing engine 208.

If, in step 515 assignment unit 300 determines that processing engine 207 is not accepting assigned instructions, then in step 540 assignment unit 300 assigns the instruction for execution by processing engine 208. In step 545 instruction weight unit 310 computes a weighted value that is based on the latency needed to execute the assigned instruction by processing engine 308. In step 550 the count unit 305 corresponding to processing engine 208 increments the weighted instruction count for processing engine 208 by the computed weighted value to update the weighted instruction count.

If, in step 510 assignment unit 300 determines that the weighted instruction count for processing engine 207 is greater than the weighted instruction count for processing engine 208, then in step 512 assignment unit 300 determines if a processing engine 208 is accepting assigned instructions. If, in step 512 assignment unit 300 determines that a processing engine 208 is accepting assigned instructions, then in step 540 assignment unit 300 assigns the instruction for execution by the processing engine 208. Otherwise, in step 525 assignment unit 300 assigns the instruction for execution by a processing engine 207.

Figure 5B:
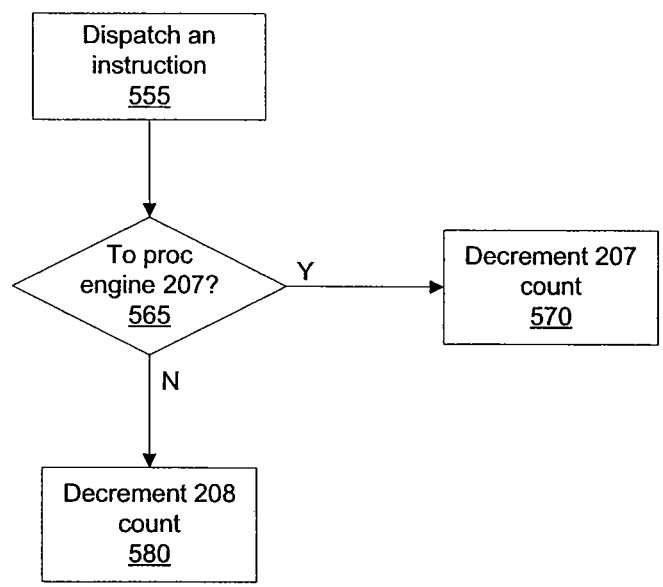
FIG. 5B is a flow diagram of method steps for updating the load balancing information when an instruction is dispatched for execution in accordance with one or more aspects of the present invention.

FIG. 5B is a flow diagram of method steps for updating the load balancing information when a program instruction is dispatched for execution by one of the heterogeneous processing engines 207, 208, or 209, in accordance with one or more aspects of the present invention. FIG. 5B illustrates updating the load balancing information when two types of heterogeneous processing engines are used. In other embodiments of the present invention, additional heterogeneous processing engines may be used, and those skilled in the art may extend the described method to include those additional heterogeneous processing engines in the updating process.

In step 525 dispatcher 435 outputs an assigned instruction for execution by a processing engine and provides the assignment information for the dispatched instruction to assignment unit 300. In step 565 assignment unit 300 determines if the dispatched instruction was assigned for execution by processing engine 207, and if so, in step 570 the count unit 305 corresponding to processing engine 207 decrements the weighted count by the weight value corresponding to the dispatched instruction. If, in step 565 assignment unit 300 determines that the dispatched instruction was not assigned for execution by processing engine 207, i.e., the dispatched instruction was assigned for execution by processing engine 208, then in step 575 the count unit 305 corresponding to processing engine 208 decrements the weighted count by the weight value corresponding to the dispatched instruction.

An advantage of the disclosed system and method is that instruction execution throughput may be improved when dual issue instructions are dynamically assigned for execution based on the current load of the different heterogeneous processing engines. The current load is represented by the weighted instruction count and whether or not the collectors for each processing engine are accepting instructions. A compiler can specify a target processing engine for each dual issue instruction or the compiler can specify that one or more of the dual issue instructions should be dynamically assigned. In an example graphics shader program with 35% of the instructions requiring execution by processing engine 207, 25% of the instruction requiring execution by processing engine 208, and 40% of the instructions being dual issue instructions, the dual issue instructions may be dynamically assigned to balance the processing workload between processing engine 207 and processing engine 208 to improve overall instruction execution throughput.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer-implemented method for dynamically load balancing instruction execution in a single-instruction multiple-data (SIMD) architecture with heterogeneous processing engines, comprising:

computing, prior to assigning instructions included in a set of unassigned instructions, a first initial weighted instruction count associated with a first processing engine of the heterogeneous processing engines and a second initial weighted instruction count associated with a second processing engine of the heterogeneous processing engines, based on a set of expected latencies associated with the set of unassigned instructions, wherein a dual-issue instruction that is included in the set of unassigned instructions and that is configured to specify the first processing engine as a target is assigned a weighted value of zero in both the first initial weighted instruction count and the second initial weighted instruction count, wherein only the first processing engine is configured to execute instructions of a first single-issue type included in the set of unassigned instructions, wherein only the second processing engine is configured to execute instructions of a second single-issue type that is different than the instructions of the first single-issue type included in the set of unassigned instructions, and wherein the dual-issue instruction is executable in parallel for multiple threads in a SIMD thread group by the first processing engine and the second processing engine;

assigning the instructions in the set of unassigned instructions to the first processing engine or the second processing engine based on the first initial weighted instruction count and the second initial weighted instruction count;

computing a first weighted instruction count for the instructions assigned to the first processing engine that is proportional to an execution latency corresponding to instructions that are assigned to the first processing engine;

computing a second weighted instruction count for the instructions assigned to the second processing engine that is proportional to an execution latency corresponding to instructions that are assigned to the second processing engine;

determining that the first weighted instruction count associated with the first processing engine is greater than the second weighted instruction count associated with the second processing engine;

overriding the target specified by the dual-issue instruction;

assigning the dual-issue instruction for execution by the second processing engine based on the first weighted instruction count being greater than the second weighted instruction count;

receiving a control instruction;
extracting a target address from the control instruction; and
reading and executing one or more instructions starting at the target address.

2. The computer-implemented method of claim 1, further comprising:
determining that a second instruction is assigned to the first processing engine for execution; and
computing a weighted value for the second instruction that is proportional to an execution latency that is incurred when the second instruction is executed by the first processing engine.

3. The computer-implemented method of claim 2, further comprising updating the first weighted instruction count associated with the first processing engine by adding the weighted value for the second instruction to the first weighted instruction count.

4. The computer-implemented method of claim 3, further comprising updating the first weighted instruction count associated with the first processing engine by subtracting the weighted value for the second instruction from the first weighted instruction count when the second instruction is dispatched for execution.

5. The computer-implemented method of claim 1, wherein a first weighted value computed for execution of the dual issue instruction by the first processing engine does not equal a second weighted value computed for execution of the dual issue program instruction by the second processing engine.

6. A non-transitory computer-readable medium storing instructions for causing a SIMD architecture processor that includes heterogeneous processing engines to dynamically load balance instruction execution by performing the steps of:
computing, prior to assigning instructions included in a set of unassigned instructions, a first initial weighted instruction count associated with a first processing engine of the heterogeneous processing engines and a second initial weighted instruction count associated with a second processing engine of the heterogeneous processing engines, based on a set of expected latencies associated with the set of unassigned instructions, wherein a dual-issue instruction that is included in the set of unassigned instructions and that is configured to specify the first processing engine as a target is assigned a weighted value of zero in both the first initial weighted instruction count and the second initial weighted instruction count, wherein only the first processing engine is configured to execute instructions of a first single-issue type included in the set of unassigned instructions, wherein only the second processing engine is configured to execute instructions of a second single-issue type that is different than the instructions of the first single-issue type included in the set of unassigned instructions, and wherein the dual-issue instruction is executable in parallel for multiple threads in a SIMD thread group by the first processing engine and the second processing engine;
assigning the instructions in the set of unassigned instructions to the first processing engine or the second processing engine based on the first initial weighted instruction count and the second initial weighted instruction count;
computing a first weighted instruction count for the instructions assigned to the first processing engine that is proportional to an execution latency corresponding to instructions that are assigned to the first processing engine;
computing a second weighted instruction count for the instructions assigned to the second processing engine that is proportional to an execution latency corresponding to instructions that are assigned to the second processing engine;
determining that the first weighted instruction count associated with the first processing engine is greater than the second weighted instruction count associated with the second processing engine;
overriding the target specified by the dual-issue instruction;
assigning the dual issue program instruction for execution by the second processing engine based on the first weighted instruction count being greater than the second weighted instruction count
receiving a control instruction;
extracting a target address from the control instruction; and
reading and executing one or more instructions starting at the target address.

7. The non-transitory computer-readable medium of claim 6, further comprising the steps of:
determining that a second instruction is assigned to the first processing engine for execution; and
computing a weighted value for the second instruction that is proportional to an execution latency that is incurred when the second instruction is executed by the first processing engine.

8. The non-transitory computer-readable medium of claim 7, further comprising the step of updating the first weighted instruction count associated with the first processing engine by adding the weighted value for the second instruction to the first weighted instruction count.

9. The non-transitory computer-readable medium of claim 8, further comprising the step of updating the first weighted instruction count associated with the first processing engine by subtracting the weighted value for the second instruction from the first weighted instruction count when the second instruction is dispatched for execution.

10. The non-transitory computer-readable medium of claim 6, wherein a first weighted value computed for execution of the dual issue instruction by the first processing engine does not equal a second weighted value computed for execution of the dual issue instruction by the second processing engine.

11. A system for dynamically load balancing instruction execution in a single-instruction multiple-data (SIMD) architecture with heterogeneous processing engines, comprising:
a first processing engine of the heterogeneous processing engines that is configured to execute dual issue instructions and instructions of a first type in parallel for multiple threads in a SIMD thread group, wherein only the first processing engine is configured to execute instructions of the first type;
a second processing engine of the heterogeneous processing engines that is configured to execute dual issue instructions and instructions of a second type that is different than the first type in parallel for the multiple threads in the SIMD thread group, wherein only the second processing engine is configured to execute instructions of the second type;
a work distribution unit coupled to the first processing engine and the second processing engine and configured to:
compute, prior to assigning instructions included in a set of unassigned instructions, a first initial weighted instruction count associated with the first processing engine and a second initial weighted instruction count associated with the second processing engine, based on a set of expected latencies associated with the set of unassigned instructions, wherein a dual-issue instruction that is included in the set of unassigned instructions and that is configured to specify the first processing engine as a target is assigned a weighted value of zero in both the first initial weighted instruction count and the second initial weighted instruction count, wherein only the first processing engine is configured to execute instructions of a first single-issue type included in the set of unassigned instructions, wherein only the second processing engine is configured to execute instructions of a second single-issue type that is different than the instructions of the first single-issue type included in the set of unassigned instructions, and wherein the dual-issue instruction is executable in parallel for multiple threads in a SIMD thread group by the first processing engine and the second processing engine;

assign the instructions in the set of unassigned instructions to the first processing engine or the second processing engine based on the first initial weighted instruction count and the second initial weighted instruction count;

compute a first weighted instruction count for the instructions assigned to the first processing engine that is proportional to an execution latency corresponding to instructions that are assigned to the first processing engine;

compute a second weighted instruction count for the instructions assigned to the second processing engine that is proportional to an execution latency corresponding to instructions that are assigned to the second processing engine;

determine that a first weighted instruction count associated with the first processing engine is greater than a second weighted instruction count associated with the second processing engine, override the target specified by the dual-issue instruction, and assign the dual issue instruction for execution by the second processing engine based on the first weighted instruction count being greater than the second weighted instruction count; and an instruction unit included in the first processing engine that is configured to:

receive a control instruction, extract a target address from the control instruction, and read and cause one or more instructions in the set of unassigned instructions to be executed at the target address.

12. The system of claim 11, wherein the work distribution unit is further configured to:

determine that a second instruction is assigned to the first processing engine for execution;

compute a weighted value for the second instruction that is proportional to an execution latency that is incurred when the second instruction is executed by the first processing engine.

13. The system of claim 12, wherein the work distribution unit is further configured to update the first weighted instruction count associated with the first processing engine by adding the weighted value for the second instruction to the first weighted instruction count.

14. The system of claim 13, wherein the work distribution unit is further configured to update the first weighted instruction count associated with the first processing engine by subtracting the weighted value for the second instruction from the first weighted instruction count when the second instruction is dispatched for execution.

15. The system of claim 11, wherein a first weighted value computed for execution of the dual issue program instruction by the first processing engine does not equal a second weighted value computed for execution of the dual issue instruction by the second processing engine.

* * * * *